United States Patent [19]

Tripp

[11] Patent Number: 5,340,630
[45] Date of Patent: Aug. 23, 1994

[54] TWO PLY MATERIAL MADE FROM USED VEHICLE TIRES

[76] Inventor: Benjamin A. Tripp, R.R. #2, Orangeville, Ontario, Canada, L9W 2Y9

[21] Appl. No.: 37,385

[22] Filed: Mar. 26, 1993

Related U.S. Application Data

[63] Continuation-in-part of Ser. No. 750,936, Aug. 28, 1991, abandoned.

[51] Int. Cl.⁵ ............................................... B32B 3/14
[52] U.S. Cl. .................................... 428/54; 428/57; 428/58; 428/60; 428/61; 428/903.3; 156/95
[58] Field of Search .................... 428/54, 57, 58, 61, 428/60, 903.3; 156/95; 52/DIG. 9

[56] References Cited

U.S. PATENT DOCUMENTS

| | | | |
|---|---|---|---|
| 4,530,868 | 7/1985 | Shinmi et al. | 428/61 |
| 5,096,772 | 3/1992 | Snyder | 428/295 |

*Primary Examiner*—Alexander S. Thomas
*Attorney, Agent, or Firm*—Ridout & Maybee

[57] ABSTRACT

A two ply laminated structural material is made from used vehicle tires, such as steel belted radial automobile tires. Each ply consists of a plurality of individual tread bearing tire belts joined end to end. The individual belts are made from tires by removing the tire sidewalls and transversely cutting the annular remainder. The individual belts are joined so as to provide a continuous structural belt capable of carrying a load in tension. By bonding two such belts together thread to thread using adhesive or vulcanization, a structural material is obtained having sufficient stiffness and strength to be used in the manufacture of a variety of rubber products.

9 Claims, 4 Drawing Sheets

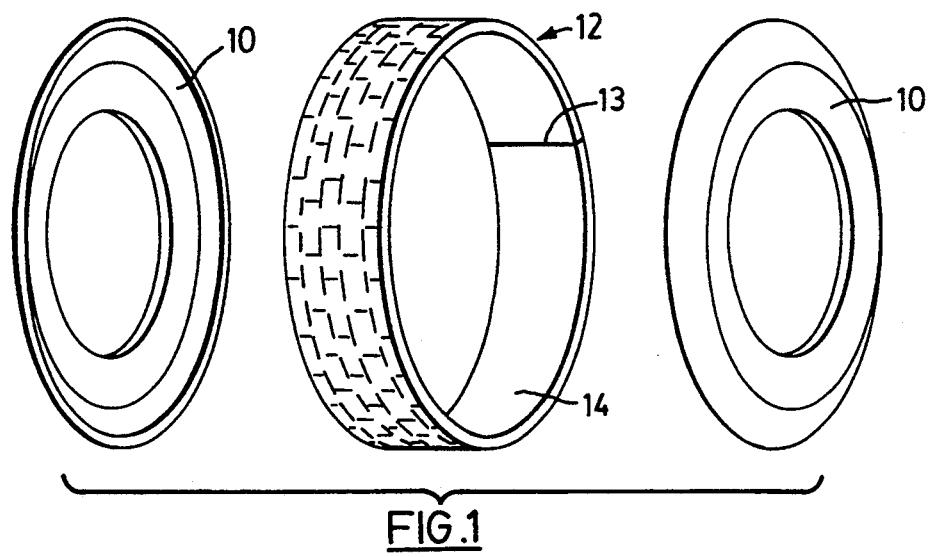
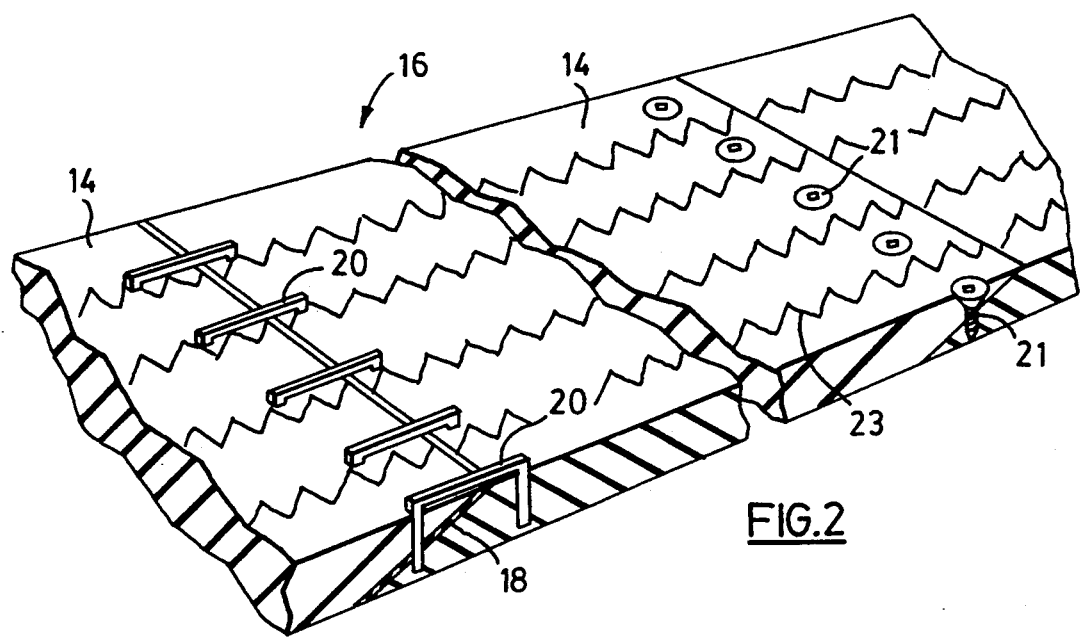

TWO PLY MATERIAL MADE FROM USED VEHICLE TIRES

This application is a continuation-in-part of U.S. Ser. No. 07/750936 filed Aug. 28, 1991, which is abandoned.

The invention is a material formed from used vehicle tire belts which are laminated in two plies. The material is useful for the manufacture of a variety of products.

Discarded vehicle tires pose a significant environmental hazard, yet there has been no economic means for utilizing such tires so that recycling them would be encouraged. Secondary uses for discarded vehicle tires must compete economically with manufacturing using raw materials. Currently, raw materials have a low price in relation to the cost of reprocessed or recycled materials. This fact is the central challenge facing the recycling industry, and is nowhere more apparent than in relation to the recycling of vehicle tires.

The reinforced belt of a vehicle tire possesses great strength and potentially may be useful as a substrate for the manufacture of other useful products. Others have recognized this principle but have failed to solve the problem of economically, i.e. profitably, manufacturing products from used tires, or to solve the problem of manufacturing products having market acceptance, or both. The economic problem centers around the perception in the art that used vehicle tires require a fair amount of processing to provide a material which is suitable for use in further manufacturing. Thus, prior uses of tire belts have involved processing tires to remove their sidewalls and treads yielding more or less uniform belts which are used as building blocks in the manufacture of products. These prior belts are relatively costly to produce as the step of tread removal is controlling in establishing the cost of the substrate belt material used in the subsequent manufacturing. The product acceptance problem stems from the use of belts formed from individual tires as building blocks for manufacturing secondary products. In order to provide such products with sufficient stiffness, three or more layers, or plies, of belts must be used. The resulting thickness usually provides a product which is too bulky and heavy as compared to a product made from raw materials. Obviously, the use of three or four plies to make a product costs more than the use of two plies. Thus, market acceptance of such products is lacking.

As used herein, the term "belt" or "tire belt" means a plurality of individual automobile or light truck tires having their sidewalls removed, being cut transversely to form strips and being joined together end to end to form a continuous elongate member with one side having a tread surface. The term "individual belt" means a belt portion formed from a single tire.

The present invention addresses the problems associated with prior materials formed from used vehicle tires by providing a two ply laminated structural material made from two tire belts adhered together tread surface to tread surface. The resulting two ply laminate is structurally stiff, capable of carrying bending, shear, tension or compression loads anywhere along its length.

The material of the invention may be used to make tubes, beams, boards, posts and other products. The two ply laminate of the invention is economical to produce and possesses acceptable size and weight characteristics.

BRIEF DESCRIPTION OF THE DRAWINGS

FIG. 1 is an exploded perspective view of a vehicle tire showing the production of an individual belt.

FIGS. 2-5 are perspective views showing various methods of connecting individual belts in end to end relation.

As shown in FIG. 1, a used vehicle tire is processed to remove its sidewalls 10, for example, by cutting them off, and then the remaining annular portion 12 is cut transversely at 13 to form an individual belt 14. A plurality of individual belts 14 are joined in end to end relation to provide a belt 16 for use in making the structural material of the invention. Steel belt reinforced tires, such as steel belted radial tires, are particularly useful for making the belts 16, but the belts 16 can be made from all types of vehicles tires.

As shown in FIGS. 2-5, various means can be used to join individual belt pieces 14 to form a belt 16. In FIG. 2, the annular tire portion 12 is cut at 13 on an angle to give bevelled ends which allow an overlapping end to end joint to be made between individual belts 14. The end to end connection of individual belts 14 is made using adhesive or by vulcanization 18 and may be reinforced with mechanical fasteners such as staples 20 or screws 21. The belt 16 is constructed so that the tread surface 23 is continuous along one side of its length.

Figure 3:
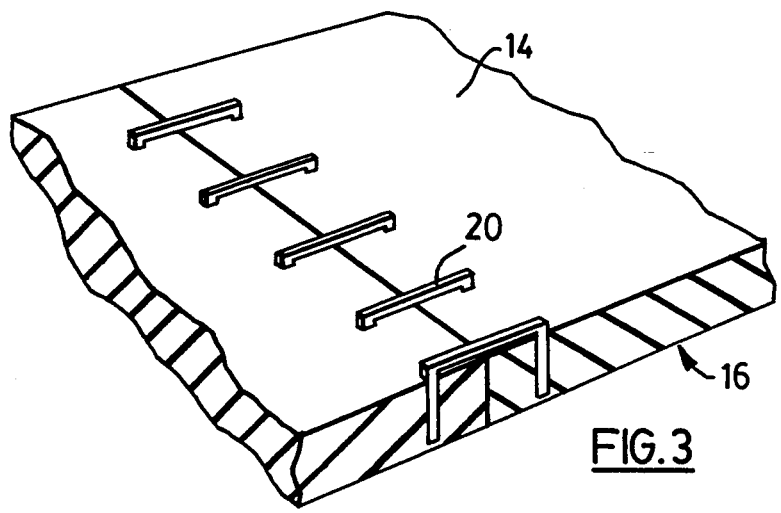
Figure 4:
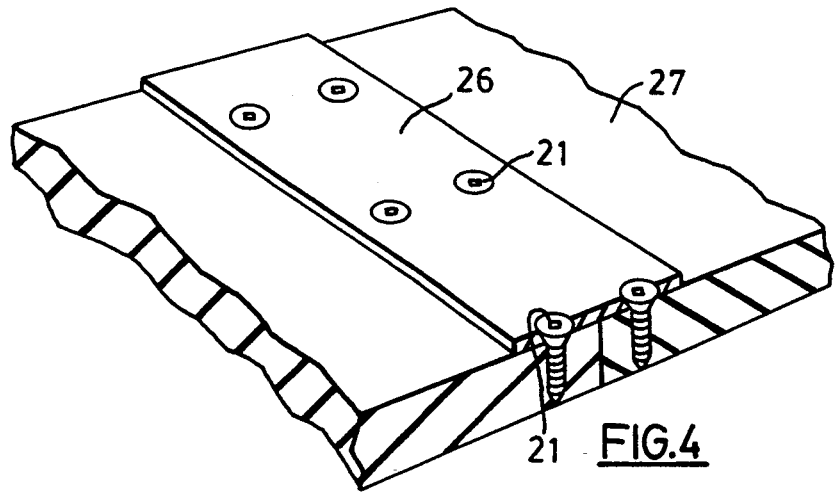
Figure 5:
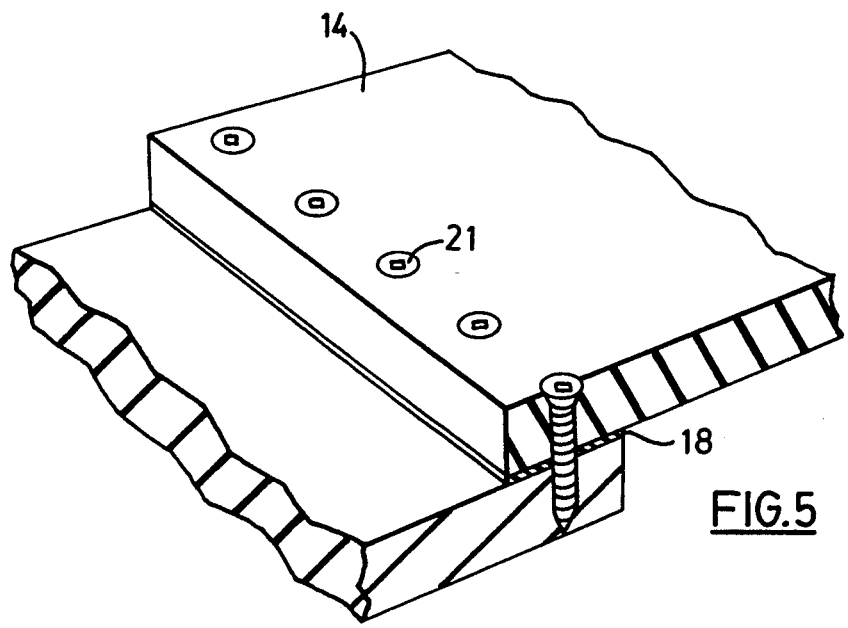
Figure 6:
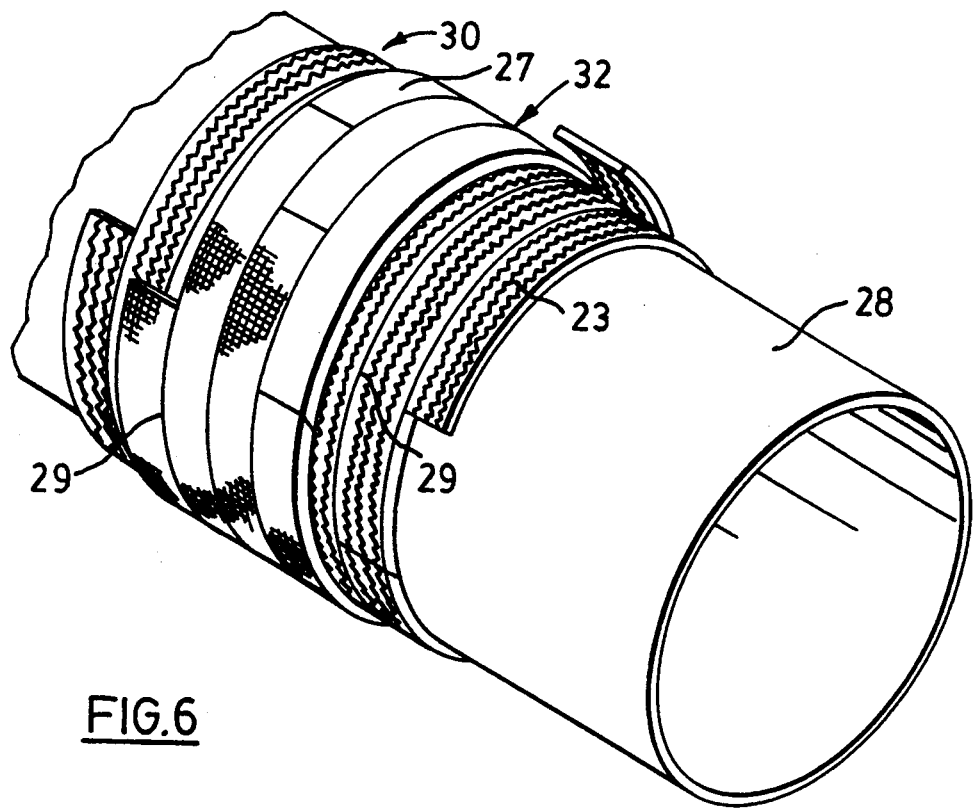
FIG. 6 is a perspective view of a two ply tube in accordance with the invention.
Figure 7:
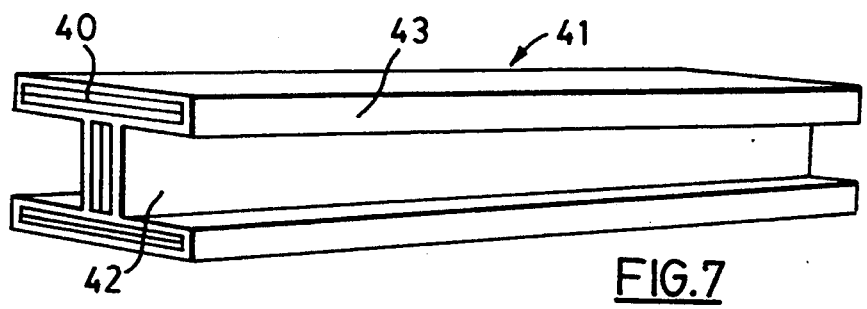
FIGS. 7-12 are perspective views showing various linear structural products made using the material of the invention.

Various other means of end to end connection of individual belts 14 to form a belt 16 may be used, and several such possible means are shown in FIGS. 3-5. Thus, belt portions 14 can simply be stapled together (FIG. 3). A metal plate 26 can be secured across a joint using screws 21 as shown in FIG. 4. In this case, the plate 26 should be located on the non-tread side 27 of the belt 16. A simple overlapping joint (FIG. 5) secured by adhesive or vulcanization 18, preferably reinforced by mechanical means such as by screws 21, is also suitable for the purposes of the invention.

The important aspect of forming the end to end joints between belt portions 14 is that such joints are of sufficient strength to allow the resultant belt 16 to carry a load in tension longitudinally. The tension load which the belt 16 must be able to carry need be no greater than about 10% of the tension load capability of an individual tire belt 14. The belt 16 must have structural continuity, and in this regard, the capability of the belt 16 to carry a load in tension is essential.

The two ply laminate of the invention is made by adhering two belts 16 together. The lamination may be effected with adhesive or by vulcanization. Since each belt 16 has a tread surface which forms a good bond, and an inner tire surface 27 which poorly bonds with adhesive or rubber, the laminate of the invention preferably is formed by bonding the tread surfaces 23 of opposing belts 16 to one another. By bonding opposing tread surfaces 23 together, a laminate 40 is formed having a bond between the plies which approximates the strength of the rubber of each ply. Also, the tread to tread bonding spaces the reinforcing materials of each belt 16 as far apart as possible, thereby affording the laminate 40 the maximum stiffness which the belts 16 can provide.

Prior tire belt laminate material was constructed from individual tire belts 14 with the tread surface 23 being removed. These prior materials were not structurally viable in the form of a two ply laminate because they were incapable of carrying a bending load. By using structurally continuous belts 16 to form a two ply laminate material, structural integrity of the material is achieved. The two ply laminate 40 of the invention can carry a bending load in any direction without failing, i.e., breaking, delaminating or separating between end to end joints of the belts 16. The material can also carry loads in shear, tension or compression anywhere along its length. The material of the invention is a structurally viable substrate for the production of a variety of products.

In accordance with the invention a rubber tube may be made by a helical winding method using the belt 16 prepared as described above. The belt 16 is helically wound around a mandrel 28, with the belt edges 29 being adhesively interconnected to form a first layer 30 of the tube. Similarly, a second belt 16 is helically wound around and adhered to the first layer 30 to form a second layer 32, with the belt edges 29 in the second layer 32 being out of alignment with the edges 29 of the first layer 30. The two layers 30 and 32 are bonded tread to tread using adhesive or vulcanization. The formed tube is removed from the mandrel 28 and the ends of the tube may be trimmed.

The tubes may be used, for example, as culverts, low pressure water pipes, impact barrier casings, sewer pipes, various posts, silos, grain storage bins and the like. In the case of impact barriers for use along highways, the sidewall portions 10 removed from the used tires may serve as a filling material within the tubes, and for this purpose the sidewall portions 10 removed from the used tires may be shredded, chopped or pulverized. Alternatively, a stack of these sidewall portions 10 may be disposed as the filling material within the tube. The impact resistance can be varied by varying the tube diameter, thickness of the tube wall and the amount of the filling materials.

The structural properties of the two ply laminate material of the invention render the material quite useful for the production of various elongate products such as planks, posts, boards, and beams. As shown in FIGS. 7–12, the two ply laminate 40 of the invention can be used to provide structural stiffness and strength to a variety of rubber molded products. Thus, a rubber I-beam 41 can be molded using three laminates 40 disposed as shown in an I configuration. The I-beam can be designed to have sufficient strength for a variety of uses such as deck or dock planking, a sign post, or a guide rail. By varying the widths and thicknesses of the web 42 and flange 44 members, beams 41 having structural characteristics suited to the purpose can be manufactured.

Figure 8:
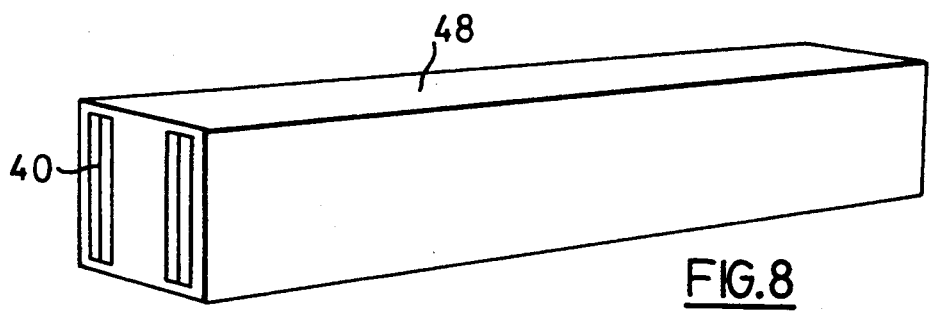
Figure 9:
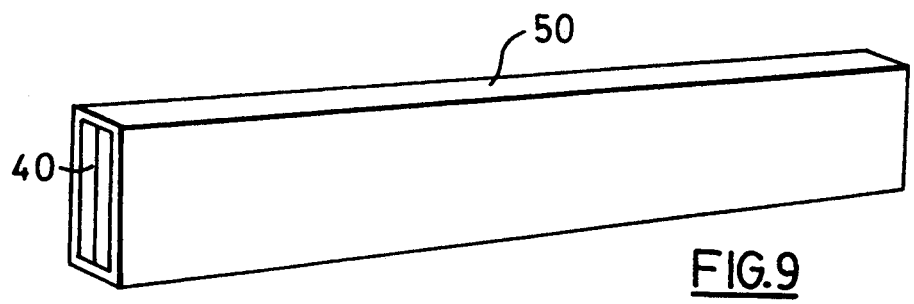

Weather resistant fencing and dock cribs and bumpers can be made by molding rubber about one or two lengths of two ply material 40 of the invention. FIG. 8 shows a configuration for a rubber molded beam 48 having two lengths of laminate 40 providing structural strength. The beam 48 may be used as a fence post or dock crib. A board 50 made from a single length of two ply material 40 (FIG. 9) may be used as a fence board or dock bumper.

Figure 10:
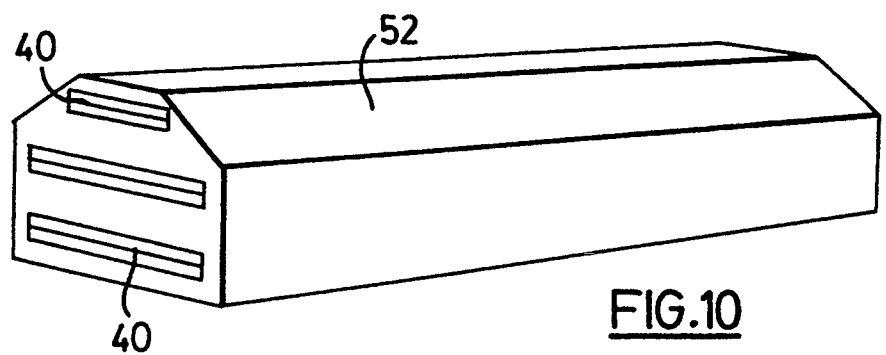
Figure 11:
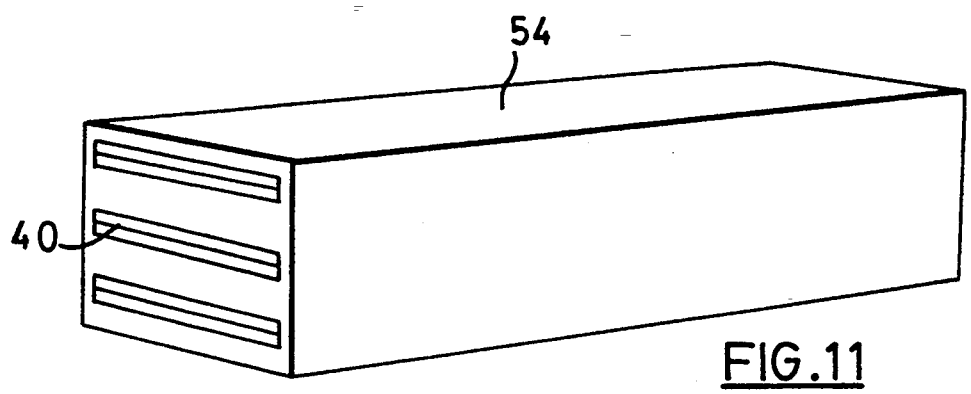

Heavy duty products may also be made using the laminate 40 of the invention. FIG. 10 shows a curb block 52 molded of rubber about three lengths of laminate 40 which provide stiffness and strength to the product. Likewise, a heavy duty construction log 54 (FIG. 11) may be molded of rubber using three spaced lengths of laminate 40.

Figure 12:
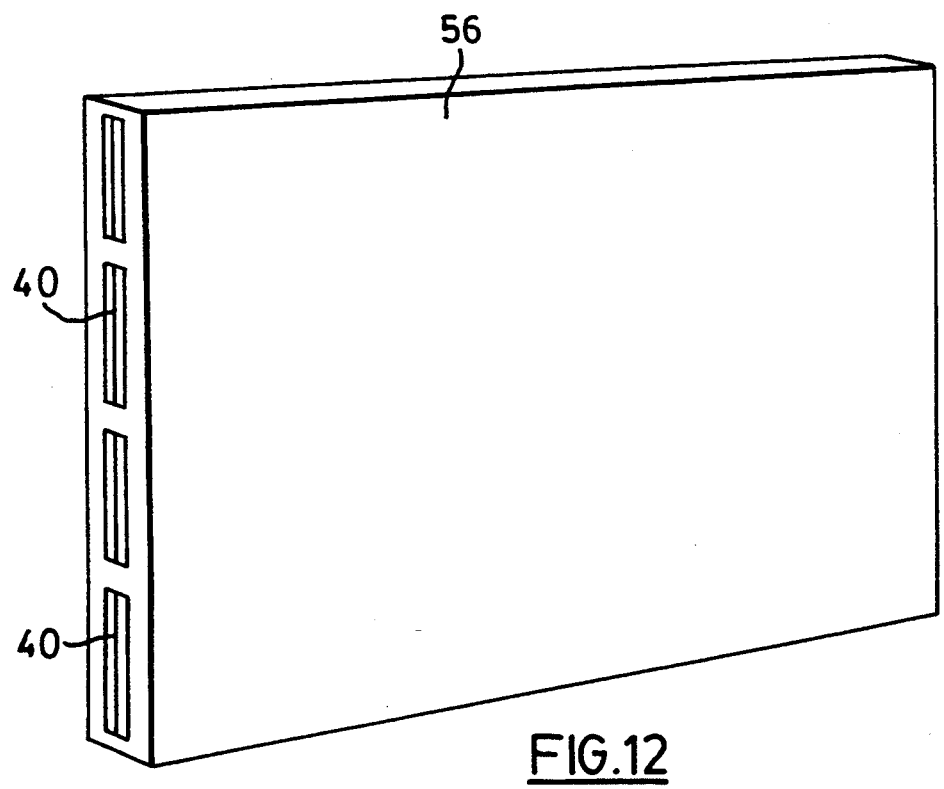

As shown in FIG. 12, lengths of two ply laminate 40 of the invention may be arranged side by side in a plane to provide structural stiffness for the production of a sheet material 56 which may be used, for example, as signboard.

While the foregoing examples illustrate some uses for the laminate of the invention, the skilled person will appreciate the wide variety of uses to which the laminate may be applied.

I claim:

1. A two ply laminated structural material, comprising:
    a first continuous ply of used vehicle tire belt consisting of a plurality of tread bearing tire belts from individual tires joined end to end so that the continuous ply is capable of carrying a load in tension which is at least 10% of the magnitude of a load in tension which an individual tire belt can carry; and
    a second continuous ply of used vehicle tire belt like the first continuous ply, wherein the first and second plies are bonded together tread surface to tread surface so that the resulting two ply laminated material is capable of carrying a bending, a shear, a tension, or a compression load anywhere along its length.

2. A two ply laminated structural material as claimed in claim 1, wherein the individual tire belts are joined end to end by bonding overlapping ends with adhesive.

3. A two ply laminated structural material as claimed in claim 1, wherein the individual tire belts are joined end to end by bonding overlapping ends by vulcanization.

4. A two ply laminated structural material as claimed in claim 1, wherein the individual tire belts are joined end to end by mechanical fastening means.

5. A two ply laminated structural material as claimed in claim 4, wherein the fastening means are screws or staples.

6. A two ply laminated structural material as claimed in claim 1, wherein the first and second plies are bonded together using adhesive.

7. A two ply laminated structural material as claimed in claim 1, wherein the first and second plies are bonded together by vulcanization.

8. A two ply laminated structural material as claimed in claim 1, wherein the vehicle tire belt is formed from steel reinforced tires.

9. A two ply laminated structural material as claimed in claim 8, wherein the tires are steel belted radial tires.

* * * * *